(12) United States Patent
Bushell et al.

(10) Patent No.: US 10,009,628 B2
(45) Date of Patent: Jun. 26, 2018

(54) TUNING VIDEO COMPRESSION FOR HIGH FRAME RATE AND VARIABLE FRAME RATE CAPTURE

(71) Applicant: Apple Inc., Cupertino, CA (US)

(72) Inventors: John Samuel Bushell, San Jose, CA (US); Davide Concion, San Jose, CA (US); David Saracino, San Francisco, CA (US); Erik Turnquist, Emeryville, CA (US)

(73) Assignee: Apple Inc., Cupertino, CA (US)

( * ) Notice: Subject to any disclaimer, the term of this patent is extended or adjusted under 35 U.S.C. 154(b) by 427 days.

(21) Appl. No.: 13/972,434

(22) Filed: Aug. 21, 2013

(65) Prior Publication Data

US 2014/0362918 A1 Dec. 11, 2014

Related U.S. Application Data

(60) Provisional application No. 61/832,447, filed on Jun. 7, 2013, provisional application No. 61/841,635, filed on Jul. 1, 2013.

(51) Int. Cl.
*H04N 19/30* (2014.01)
*H04N 19/44* (2014.01)
(Continued)

(52) U.S. Cl.
CPC ......... *H04N 19/587* (2014.11); *H04N 19/107* (2014.11); *H04N 19/132* (2014.11);
(Continued)

(58) Field of Classification Search
CPC .. H04N 19/107; H04N 19/132; H04N 19/146; H04N 19/172; H04N 19/577; H04N 19/587
(Continued)

(56) References Cited

U.S. PATENT DOCUMENTS 6,014,694 A 1/2000 Aharoni et al.
6,034,731 A * 3/2000 Hurst, Jr. ......... H04N 21/23608
348/461

(Continued)

FOREIGN PATENT DOCUMENTS

EP 0897245 A2 2/1999

OTHER PUBLICATIONS

Hunter J et al: "A review of video streaming over the internet", DSTC Technical Report, No. TR97-10, (Aug. 1, 1997)*
(Continued)

*Primary Examiner* — Jamie Atala
*Assistant Examiner* — James Boylan
(74) *Attorney, Agent, or Firm* — Baker & Hostetler LLP

(57) ABSTRACT

Video data with high frame rates may be displayed on devices with limited resources (e.g., decoder and/or display resources). These devices may have their resources devoted to other tasks or may not be capable to display the video data at the high frame rates. The coding method may include coding the frames such that additional droppable frames are included in the encoded video data. The decoding method may include dropping droppable frames before the encoded video data is decoded to reduce the number of frames that will be decoded and displayed. These methods may be applied to video data that has a variable frame rate and may be combined with processing the image sequence for slow motion playback.

22 Claims, 8 Drawing Sheets

(51) Int. Cl.
 *H04N 19/107* (2014.01)
 *H04N 19/132* (2014.01)
 *H04N 19/146* (2014.01)
 *H04N 19/172* (2014.01)
 *H04N 19/577* (2014.01)
 *H04N 19/587* (2014.01)
 *H04N 19/16* (2014.01)
(52) U.S. Cl.
 CPC .......... *H04N 19/146* (2014.11); *H04N 19/16* (2014.11); *H04N 19/172* (2014.11); *H04N 19/577* (2014.11)
(58) Field of Classification Search
 USPC .................................... 375/240.12, 240.15
 See application file for complete search history.

(56) References Cited

U.S. PATENT DOCUMENTS

| | | | |
|---|---|---|---|
| 7,885,338 B1 | 2/2011 | Bushell | |
| 7,958,532 B2 | 6/2011 | Paul et al. | |
| 2004/0071211 A1* | 4/2004 | Washino | H04N 21/44028 375/240.01 |
| 2004/0136689 A1* | 7/2004 | Oka | G11B 27/005 386/241 |
| 2006/0026294 A1 | 2/2006 | Virdi et al. | |
| 2006/0062297 A1 | 3/2006 | Sugiyama | |
| 2006/0150071 A1* | 7/2006 | Chen | H04N 19/159 715/203 |
| 2007/0058926 A1* | 3/2007 | Virdi | H04N 5/783 386/231 |
| 2007/0182819 A1 | 8/2007 | Monroe | |
| 2007/0291852 A1 | 12/2007 | Mori | |
| 2008/0181302 A1 | 7/2008 | Demircin et al. | |
| 2008/0253737 A1* | 10/2008 | Kimura | G11B 27/005 386/349 |
| 2009/0103619 A1* | 4/2009 | Sohn | H04N 19/597 375/240.16 |
| 2009/0274219 A1* | 11/2009 | Greene | H04N 19/115 375/240.26 |
| 2009/0313676 A1 | 12/2009 | Takeshima et al. | |
| 2010/0150230 A1 | 6/2010 | Zhou et al. | |
| 2011/0235709 A1 | 9/2011 | Shi et al. | |
| 2011/0274156 A1* | 11/2011 | Mighani | H04N 21/2381 375/240.02 |
| 2011/0299604 A1* | 12/2011 | Price | H04N 19/46 375/240.26 |
| 2011/0310956 A1* | 12/2011 | Lin | H04N 21/44004 375/240.02 |
| 2012/0183076 A1* | 7/2012 | Boyce | H04N 19/105 375/240.25 |
| 2012/0209933 A1 | 8/2012 | Ridges et al. | |
| 2013/0064308 A1 | 3/2013 | Nemiroff et al. | |
| 2013/0163962 A1* | 6/2013 | Young | H04N 5/783 386/280 |
| 2014/0015941 A1* | 1/2014 | Park | H04N 13/0438 348/56 |
| 2014/0269934 A1* | 9/2014 | Haque | H04N 19/597 375/240.25 |

OTHER PUBLICATIONS

Hunter J et al: "A review of video streaming over the internet", DSTC Technical Report, No. TR97-10, (Aug. 1, 1997).*
Schwarz et al. (Overview of the Scalable Video Coding Extension of the H.264/AVC Standard), IEEE Transactions on Circuits and Systems for Video Technology, vol. 17, No. 9, Sep. 2007.*
Hunter et al., "A Review of Video Streaming over the Internet," DSTC Technical Report TR97-10, Aug. 1, 1997, pp. 1-22.
International Search Report and Written Opinion, dated Jul. 4, 2014, from corresponding International Patent Application No. PCT/US2014/031236 filed Mar. 19, 2014.
Schwarz, H., et al., "Overview of the Scalable Video Coding Extension of the H.264/AVC Standard," IEEE Transactions on Circuits and Systems for Video Technology, vol. 17, No. 9, Sep. 2007, pp. 1103-1120.

* cited by examiner

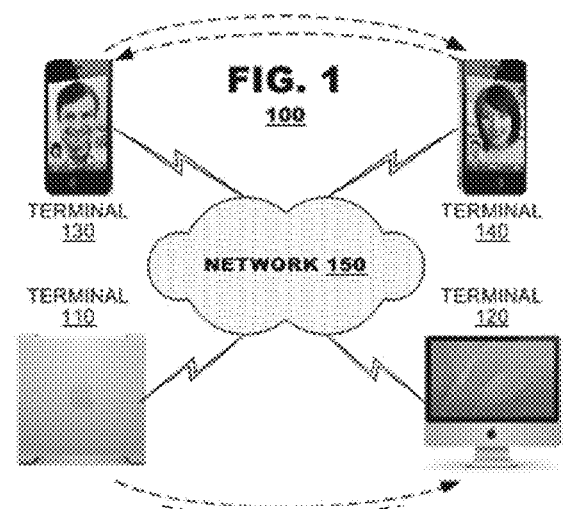
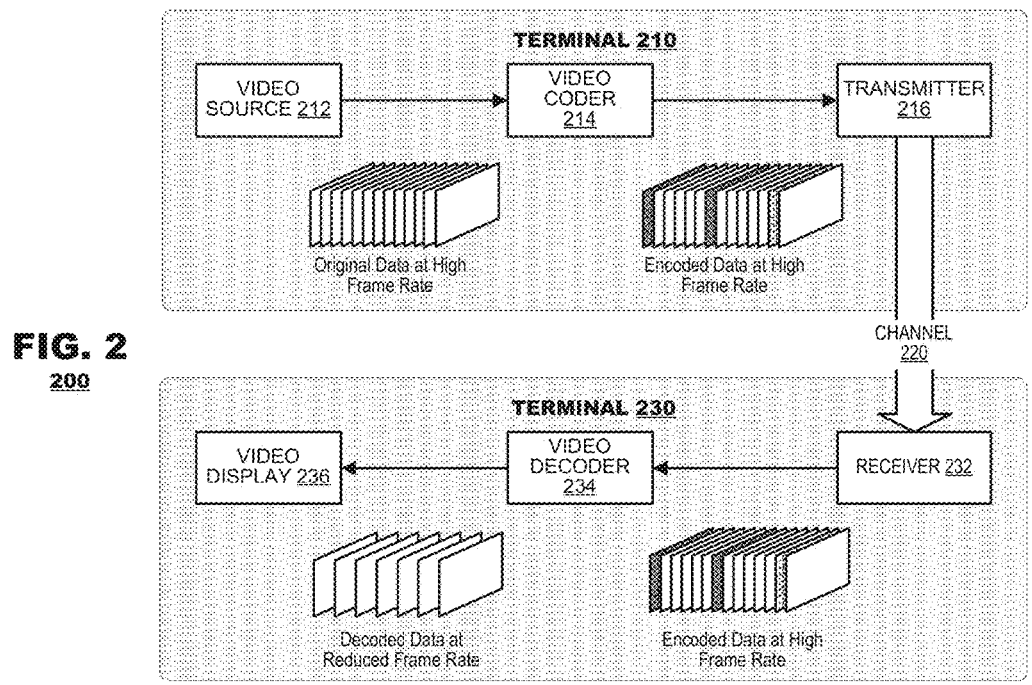

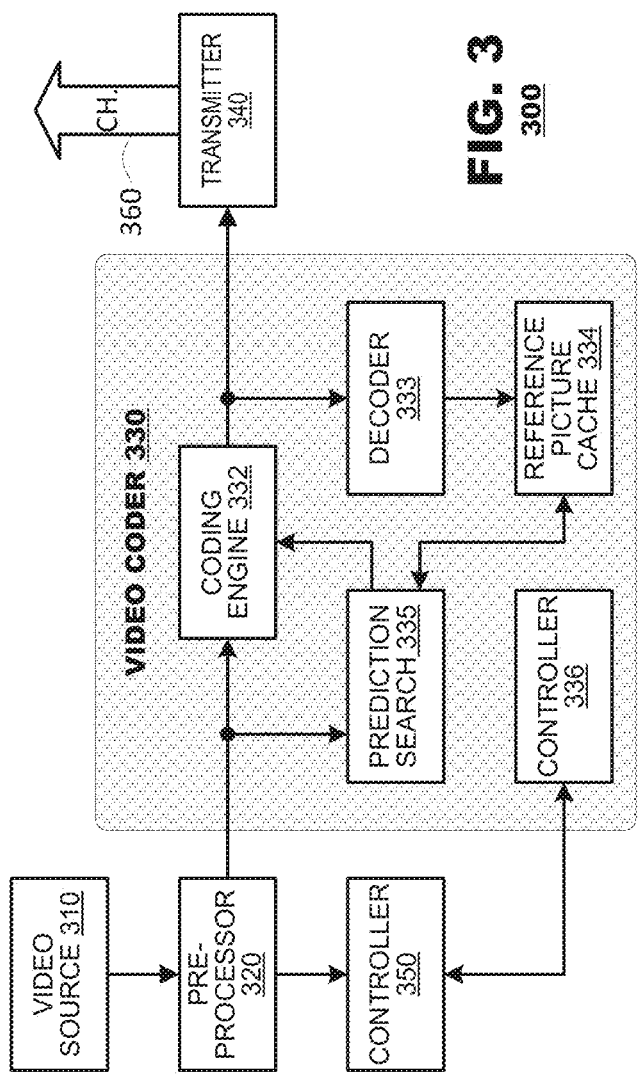

400

700

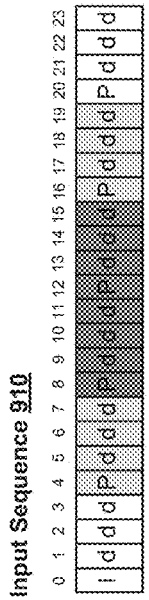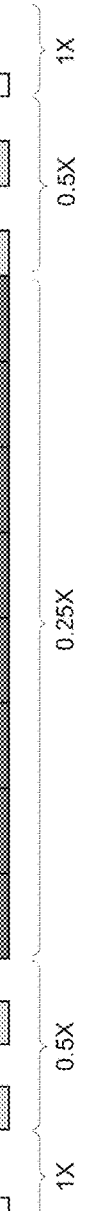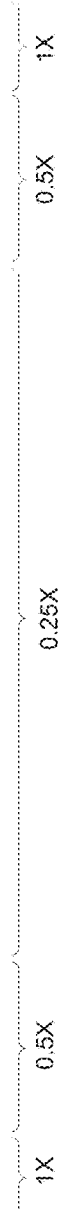
FIG. 9

TUNING VIDEO COMPRESSION FOR HIGH FRAME RATE AND VARIABLE FRAME RATE CAPTURE

PRIORITY CLAIM

The present application claims priority to U.S. Provisional Application No. 61/832,447, filed on Jun. 7, 2013, and to U.S. Provisional Application No. 61/841,635, filed on Jul. 1, 2013, the entirety of which is incorporated by reference herein.

BACKGROUND

This disclosure relates generally to the field of image and video processing. More specifically, this disclosure relates to encoding and decoding frames with droppable frames and to method of displaying encoded video with droppable frames with slow motion.

Advances in video capture technology allow for video data to be captured at high frame rates. Cameras that include such technology usually are coupled with powerful processors that can easily encode such data and transmit the encoded video content over high speed communication channels. However, devices used to display the captured video data are not always able to display the video data at the same high frame rates. These devices may have limited resources to decode the video data and to display the data in real time at the high frame rates. Thus, when a display device received encoded video data with a high frame rate, the display device may not be able to decode and display the video content in real time due to the limited resource of the device.

BRIEF DESCRIPTION OF THE DRAWINGS

So that features of the present invention can be understood, a number of drawings are described below. It is to be noted, however, that the appended drawings illustrate only particular embodiments and are therefore not to be considered limiting of its scope, for the invention may encompass other equally effective embodiments.

FIG. 1 illustrates a simplified block diagram of a video coding system according to an embodiment of the present invention.

FIG. 2 is a functional block diagram of a video capture and display system according to an embodiment of the present invention.

FIG. 3 is a functional block diagram of a video coding system according to an embodiment of the present invention.

FIG. 9 illustrates image sequences of video data that may be processed according to an embodiment of the present invention.

DETAILED DESCRIPTION

Figure 4:
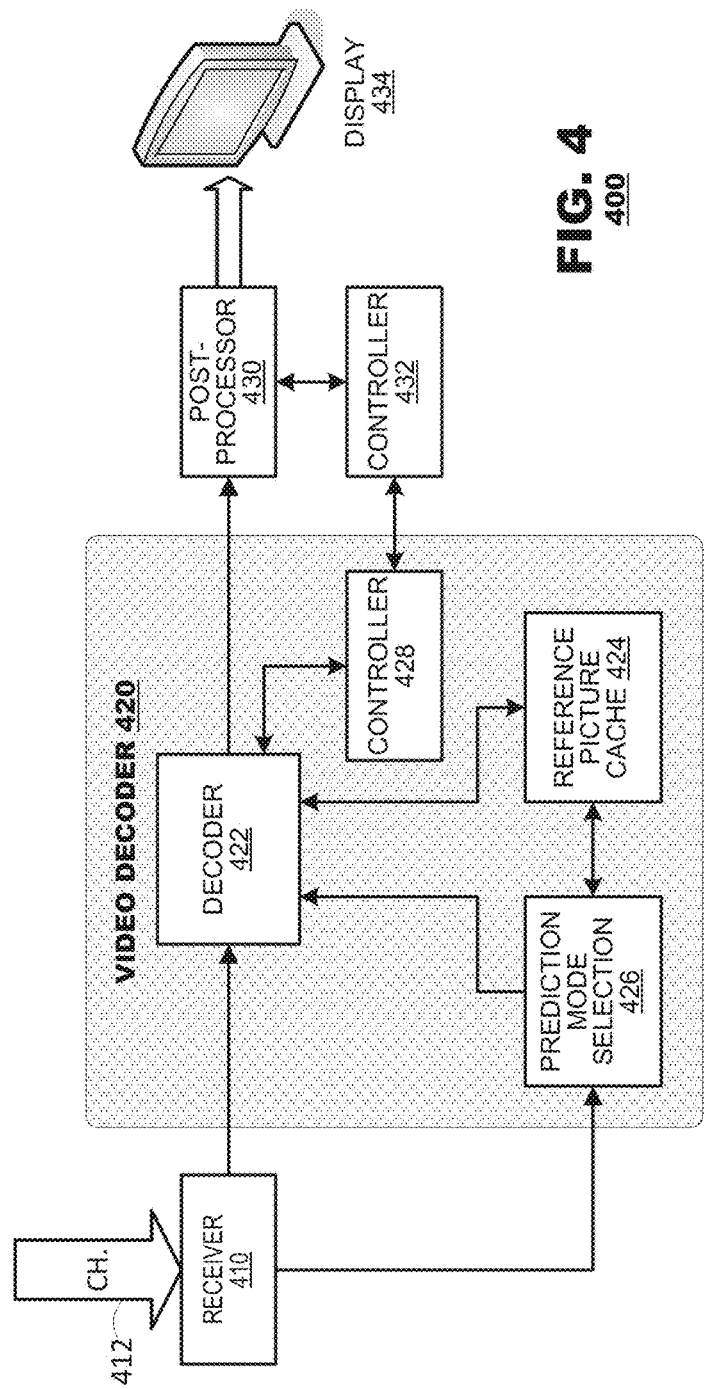
FIG. 4 is a functional block diagram of a video decoding system according to an embodiment of the present invention.

Embodiments of the present invention provide video coding and decoding systems and methods that allow for video data with high frame rates to be displayed on devices with limited resources (e.g., decoder and/or display resources). These devices may have their resources devoted to other tasks or may not be capable to display the video data at the high frame rates. The coding method may include coding the frames such that additional droppable frames are included in the encoded video data. The decoding method may include dropping droppable frames before the encoded video data is decoded to reduce the number of frames that will be decoded and displayed. These methods may be applied to video data that has a variable frame rate may be combined with processing the image sequence for slow motion playback.

FIG. 1 illustrates a simplified block diagram of a video coding system 100 according to an embodiment of the present invention. The system 100 may include a plurality of terminals 110-140 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission is common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 120, 130, 140 also may receive the coded video data transmitted by the other terminal, may decode the coded data and may display the recovered video data at a local display device.

Terminals 110-140 may capture the video at a high frame rate (e.g., 120 fps, 240 fps, etc.). Terminals 110-140 may capture the video at a variable frame rate. The frame rate at which the video is captured may dynamically change based on the content in the video, scene conditions and/or availability of processing resource used to capture and process the video. For example, when less light is available the frame rate may be lowered (e.g., from 120 fps to 20 fps). The frame rate may be increased (e.g., from 120 fps to 240 fps) by the camera or when there is increased motion within the video content. The camera may increase the capture frame rate based on the resources available to capture and process (e.g., filter and encode) the captured video.

In FIG. 1, the terminals 110-140 are illustrated as servers, personal computers and smart phones but the principles of the present invention are not so limited. Embodiments of the present invention find application with laptop computers, tablet computers, media players and/or dedicated video conferencing equipment. Terminals 120-140 may include limited resource to decode and/or display the video.

The network 150 may represent any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 is immaterial to the operation of the present invention unless explained hereinbelow.

FIG. 2 is a functional block diagram of a video capture and display system 200 according to an embodiment of the present invention. The system 200 may include a first terminal 210 for capturing and encoding video data, and a second terminal 230 for decoding the encoded video data and displaying the decoded video data. A transmitter 216 in the first terminal 210 may transmit the encoded video over a communication channel 220 to a receiver 232 in the second terminal 230.

The first terminal 210 may include a video source 212 that provides video data at a high frame rate (e.g., 120 fps or 240 fps). The frame rate of the video data provided by the video source 212 and sent to the decoder 234 may exceed a default frame rate (e.g., 24 fps, 25 fps, 30 fps or 60 fps) at which the second terminal 230 can decode and/or display the video data. To display the video data, the decoder 234 may decode only a selected number of frames from the encoded video data. The decoder 234 may drop a number of droppable frames to reduce the resources needed to decode the encoded video data. The decoder 234 may drop a number of droppable frames to bring down the frame rate to the default frame rate (i.e., frame rate which the decoder 234 can handle and/or frame rate at which the video display 236 can display the video content).

The video coder 214 in the first terminal 210 may encode the video data from the video source 212. The video coder 214 may code the video data such that the encoded frames include droppable frames which can be dropped and not decoded by the video decoder 234. Droppable frames may include frames that are not used in the prediction of any other frames. In one embodiment, while the droppable frames may depend on the data in other frames to be decoded, no other frames may depend on the data in the droppable frames. Thus, when the decoder 234 does not decode a droppable frame, other frames can still be decoded without needing the data in the decoded droppable frame.

The video coder 214 may also code the video data such that the encoded frames include non-droppable frames. Non-droppable frames may include frames that are used as reference frames for encoding other frames.

The video coder 214 may encode the video data such that the encoded video data includes enough droppable frames to bring the frame rate to a default frame rate (e.g., frame rate at which the second terminal 230 can decode and/or display the video data). Thus, the video coder may code the video data such that there are a specified number of droppable frames per second and/or specific number of non-droppable frames. The video coder 214 may mark which frames are droppable frames and/or which frames are non-droppable. The video coder 214 may have a preset default frame rate or may receive the default frame rate from the second terminal 230, which may change based on resources available to the decoder 234 and/or the display 236.

The coder 214 may encode the video data to produce droppable frames for any frames exceeding a frame rate threshold (e.g., default frame rate). For example, when the frame rate threshold is 60 fps and the frame rate provided by video source 212 is at 240 fps, at least three out of every four frames may be encoded as droppable frames. When the frame rate threshold is 60 fps and the frame rate provided by video source 212 is at 120 fps, at least one out of every two frames may be encoded as droppable frames. When the frame rate threshold is 60 fps and the frame rate provided by video source 212 is 60 fps or lower, no frames need to be droppable.

In another embodiment, the video source 212 may provide video data at a frame rate that dynamically changes. The frame rate may dynamically change based on the content in the video, scene conditions and/or availability of processing resource used to capture and process (e.g., encode) the video data. The range of the frame rate may exceed the default frame rate at which the second terminal can decode and/or display the video data. When the frame rate of the source video data exceeds a default frame rate, the video coder 214 may change the encoding parameter to provide additional droppable frames in the encoded video data. The additional droppable frames may allow the decoder 234 to drop the droppable frame and decode the encoded data at the default frame rate.

Encoding the video with droppable frames provides temporal scalability for the decoder 234, which allows more or fewer frames to be decoded depending on the decoder resources, display resources, play rate, etc. The encoded video data with the droppable frames may be sent to multiple devices, where each device may have different resources available to decode and/or display the video data. Providing the encoded data with the droppable frames may ensure that all of the devices can display the video content. Each device may choose the number of frames to decode and which frames to drop based on the resources available on the device.

Including additional droppable frames may increase the bit rate of the encoded video data, because where inter frame prediction is used, the inter frame prediction will be based from more temporally-distant frames. The more temporally-distant frames may provide less accurate prediction, which means more bits may be spent on the residual. However, because the devices receiving the data may have limited resources to decode and/or display the data, the benefits of temporal scalability for the decoder 234 may outweigh the higher resources needed to encode and transmit the video data. Thus, while the first terminal 210 (e.g., a server or a high quality camera) used to encode and transmit the data may need to have more resource for the encoding and transmitting the video data, the second terminal 230 (e.g., a smart phone or a portable terminal) may include limited resource to decode and display the video data.

FIG. 3 is a functional block diagram of a video coding system 300 according to an embodiment of the present invention.

The system 300 may include a video source 310 that provides video data to be coded by the system 300, a pre-processor 320, a video coder 330, a transmitter 340 and a controller 350 to manage operation of the system 300.

The video source 310 may provide video to be coded by the system 300. In a media serving system, the video source 310 may be a storage device storing previously prepared video. In a videoconferencing system, the video source 310 may be a camera that captures local image information as a video sequence. Video data typically is provided as a plurality of individual frames that impart motion when viewed in sequence. The frames themselves typically are organized as a spatial array of pixels. The video source 310 may provide video at a high frame rate (e.g., 120 fps or 240 fps.) and/or at a frame rate that is dynamically variable.

The pre-processor 320 may perform various analytical and signal conditioning operations on the video data. The pre-processor 320 may parse input frames into color components (for example, luminance and chrominance components) and also may parse the frames into pixel blocks, spatial arrays of pixel data, which may form the basis of further coding. The pre-processor 320 also may apply various filtering operations to the frame data to improve efficiency of coding operations applied by a video coder 330.

The video coder 330 may perform coding operations on the video sequence to reduce the video sequence's bit rate. The video coder 330 may include a coding engine 332, a local decoder 333, a reference picture cache 334, a predictor 335 and a controller 336. The coding engine 332 may code the input video data by exploiting temporal and/or spatial redundancies in the video data and may generate a datastream of coded video data, which typically has a reduced bit rate as compared to the datastream of source video data. As part of its operation, the video coder 330 may perform motion compensated predictive coding, which codes an input frame predictively with reference to one or more previously-coded frames from the video sequence that were designated as "reference frames." In this manner, the coding engine 332 codes differences between pixel blocks of an input frame and pixel blocks of reference frame(s) that are selected as prediction reference(s) to the input frame.

The local decoder 333 may decode coded video data of frames that are designated as reference frames. Operations of the coding engine 332 typically are lossy processes. When the coded video data is decoded at a video decoder (not shown in FIG. 3), the recovered video sequence typically is a replica of the source video sequence with some errors. The local decoder 333 replicates decoding processes that will be performed by the video decoder on reference frames and may cause reconstructed reference frames to be stored in the reference picture cache 334. In this manner, the system 300 may store copies of reconstructed reference frames locally that have common content as the reconstructed reference frames that will be obtained by a far-end video decoder (absent transmission errors). In one embodiment, the local decoder 333 may decode only the frames that will be decoded and displayed by the display device to replicate the decoding process. Thus, the local decoder 333 may not decode the droppable frames. In another embodiment, the local decoder 333 may decode both the non-droppable frames and droppable frames to replicate the decoding process.

The predictor 335 may perform prediction searches for the coding engine 332. That is, for a new frame to be coded, the predictor 335 may search the reference picture cache 334 for image data that may serve as an appropriate prediction reference for the new frames. The predictor 335 may operate on a pixel block-by-pixel block basis to find appropriate prediction references. In some cases, as determined by search results obtained by the predictor 335, an input frame may have prediction references drawn from multiple frames stored in the reference picture cache 334.

The controller 336 may manage coding operations of the video coder 330, including, for example, selection of coding parameters to meet a target bit rate of coded video, determining frames which may be droppable, and determining the frame rate at which non-droppable frames should be provided. Typically, video coders operate according to constraints imposed by bit rate requirements, quality requirements and/or error resiliency policies. Based on the threshold frame rate and the frame rate of the provided video, the controller 336 may change the number of droppable frames that are included in the encoded video data. The controller 336 may select coding parameters for frames of the video sequence in order to meet these constraints. For example, the controller 336 may assign coding modes and/or quantization parameters to frames and/or pixel blocks within frames.

The transmitter 340 may buffer coded video data to prepare it for transmission to the far-end terminal (not shown) via a communication channel 360. The transmitter 340 may merge coded video data from the video coder 330 with other data to be transmitted to the terminal, for example, coded audio data and/or ancillary data streams (sources not shown).

The controller 350 may manage operation of the system 300. During coding, the controller 350 may assign to each frame a certain frame type (either of its own accord or in cooperation with the controller 336), which can affect the coding techniques that are applied to the respective frame. For example, frames often are assigned as one of the following frame types:

An Intra Frame (I frame) is one that is coded and decoded without using any other frame in the sequence as a source of prediction.

A Predictive Frame (P frame) is one that is coded and decoded using earlier frames in the sequence as a source of prediction.

A Bidirectionally Predictive Frame (B frame) is one that is coded and decoded using both earlier and future frames in the sequence as sources of prediction.

The controller 350 and/or the controller 336 may assign whether frames are droppable. In another embodiment, the controller 350 and/or the controller 336 may assign whether frames are droppable and non-droppable.

Droppable frames may include frames that are not used in the prediction of any other frames. Thus, I frames, P frames and B frames may be droppable if other frames (e.g., P frames or B frames) do not depend on them to be decoded. Non-droppable frames may include frames that are used for prediction (e.g., as reference frames) of other frames. In one embodiment, reference frames may always be designated as non-droppable frames. Thus, an I frame, P frame and B frames may be non-droppable if other frames (e.g., P frames or B frames) depend on them to be decoded. Frames may be designated as non-droppable even if they are not used as a reference frame. For example, a frame that is not a reference frame may be designated as non-droppable to ensure that a specific frame rate is provided with frames designated as non-droppable or to provide other information with the designated frame to the decoder or the display device. The video coder 330 may code the frames based on the designation of whether the frame are, or should be, droppable or non-droppable.

Frames commonly are parsed spatially into a plurality of pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frames. For example, pixel blocks of I frames can be coded non-predictively or they may be coded predictively with reference to pixel blocks of the same frame (spatial prediction). Pixel blocks of P frames may be coded non-predictively, via spatial prediction or via temporal prediction with reference to one previously coded reference frame. Pixel blocks of B frames may be coded non-predictively, via spatial prediction or via temporal prediction with reference to one or two previously coded reference frames.

The video coder 330 may perform coding operations according to a predetermined protocol, such as H.263, H.264, MPEG-2 or HEVC. In its operation, the video coder 330 may perform various compression operations, including predictive coding operations that exploit temporal and spatial redundancies in the input video sequence. The coded video data, therefore, may conform to a syntax specified by the protocol being used.

In an embodiment, the transmitter 340 may transmit additional data with the encoded video. The additional data may include collected statistics on the video frames, details on operations performed by the pre-processor 320 or which frames are droppable. The additional data may be transmitted in a channel established by the governing protocol for out-of-band data. For example, the transmitter 340 may transmit the additional data in a supplemental enhancement information (SEI) channel and/or a video usability information (VUI) channel. Alternatively, the video coder 330 may include such data as part of the encoded video frames.

FIG. 4 is a functional block diagram of a video decoding system 400 according to an embodiment of the present invention. The video decoding system 400 may include a receiver 410 that receives encoded video data, a video decoder 420, a post-processor 430, a controller 432 to manage operation of the system 400 and a display 434 to display the decoded video data.

The receiver 410 may receive video to be decoded by the system 400. The encoded video data may be received from a channel 412. The receiver 410 may receive the encoded video data with other data, for example, coded audio data and/or ancillary data streams. The receiver 410 may separate the encoded video data from the other data.

The video decoder 420 may perform decoding operation on the video sequence received from the receiver 410. The video decoder 420 may include a decoder 422, a reference picture cache 424, and a prediction mode selection 426 operating under control of controller 428. The decoder 422 may reconstruct coded video data received from the receiver 410 with reference to reference pictures stored in the reference picture cache 424. The decoder 422 may output reconstructed video data to the post-processor 430, which may perform additional operations on the reconstructed video data to condition it for display. Reconstructed video data of reference frames also may be stored to the reference picture cache 424 for use during decoding of subsequently received coded video data.

The decoder 422 may perform decoding operations that invert coding operations performed by the video coder 214 (shown in FIG. 2). The decoder 422 may perform entropy decoding, dequantization and transform decoding to generate recovered pixel block data. Quantization/dequantization operations are lossy processes and, therefore, the recovered pixel block data likely will be a replica of the source pixel blocks that were coded by the video coder 330 (shown in FIG. 3) but may include some error. For pixel blocks coded predictively, the transform decoding may generate residual data; the decoder 422 may use motion vectors associated with the pixel blocks to retrieve predicted pixel blocks from the reference picture cache 424 to be combined with the prediction residuals. The prediction mode selector 426 may identify a temporal prediction mode being used for each pixelblock of an encoded frame being decoded and request the needed data for the decoding to be read from the reference picture cache 424. Reconstructed pixel blocks may be reassembled into frames and output to the post-processor 430.

As discussed above, the encoded video data may include droppable frames which are frames that are not used in the prediction of any other frames. If the decoder does not have the resources to decode the droppable frames, the display cannot display the frame rate provided with the droppable frames or the user selects a lower play back frame rate, the decoder may not decode the droppable frames. The encoded video data may include a flag on each frame that is droppable to allow the decoder 422 to drop those frames if desired. In another embodiment, the encoder may also determine which frames are droppable by analyzing the frames in the encoded video data.

The post-processor 430 may perform video processing to condition the recovered video data for rendering, commonly at a display 434. Typical post-processing operations may include applying deblocking filters, edge detection filters, ringing filters and the like. The post-processor 430 may output recovered video sequence for rendering on the display 434 or, optionally, stored to memory (not shown) for later retrieval and display. The controller 432 may manage operation of the system 400.

The video decoder 420 may perform decoding operations according to a predetermined protocol, such as H.263, H.264, MPEG-2 or HEVC, the same protocol as used by the encoder. In its operation, the video decoder 420 may perform various decoding operations, including predictive decoding operations that exploit temporal and spatial redundancies in the encoded video sequence. The coded video data, therefore, may conform to a syntax specified by the protocol being used.

In an embodiment, the receiver 410 may receive additional data with the encoded video. The additional data may include collected statistics on the video frames, details on operations performed by the pre-processor 320 (shown in FIG. 3) or which frames are droppable. The additional data may be received via a channel established by the governing protocol for out-of-band data. For example, the receiver 410 may receive the additional data via supplemental enhancement information (SEI) channel and/or video usability information (VUI) channel. Alternatively, the additional data may be included as part of the encoded video frames. The additional data may be used by the video decoder 420 and/or the post-processor 430 to properly decode the data and/or to more accurately reconstruct the original video data.

Figure 5:
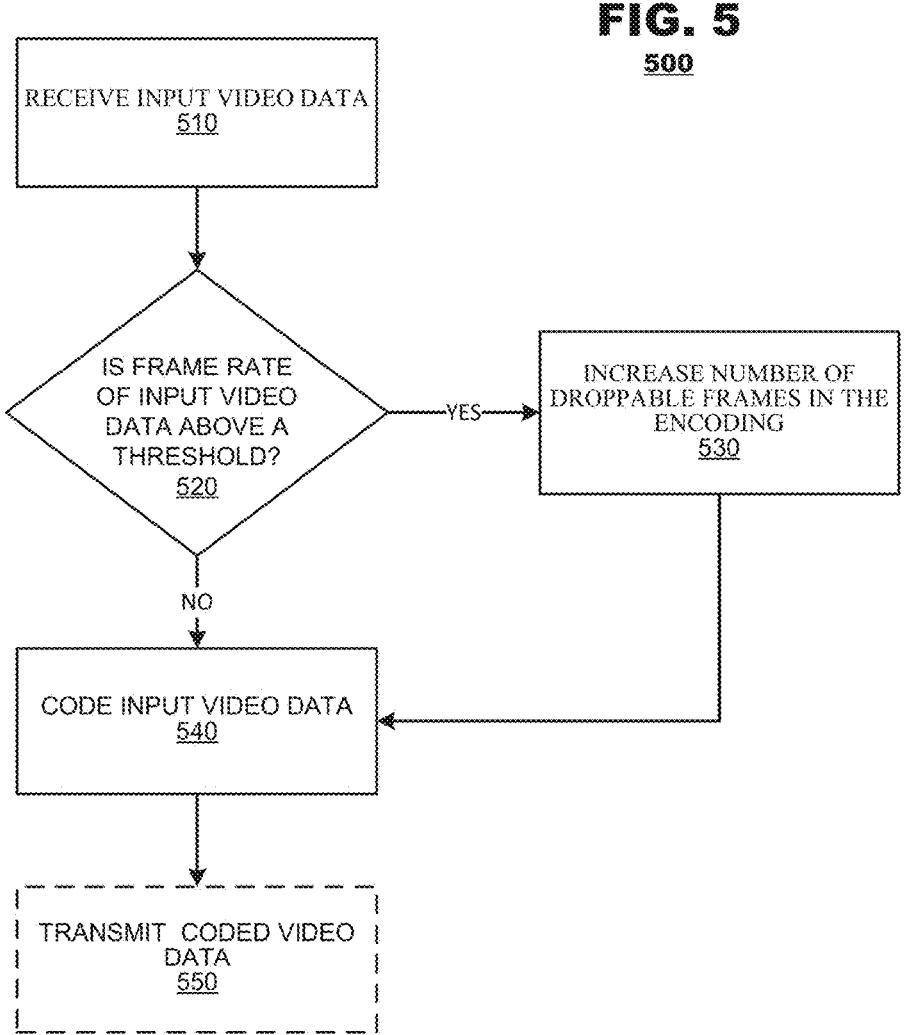
FIG. 5 illustrates a method for encoding video data with droppable frames according to an embodiment of the present invention

FIG. 5 illustrates a method 500 of encoding video data with droppable frames according to an embodiment of the present invention. The method may include receiving input video data (box 510), determining if the frame rate of the input video data is above a threshold (box 520), if the frame rate of the input video data is above a threshold, increasing the number of droppable frames in the encoding (box 530), and coding the input video data. The method may be performed by the coder 214 shown in FIG. 2.

The input video data may be received (box 510) from a video source (e.g., memory or a camera). The input video data may have a high frame rate (e.g., 120 fps or 240 fps). The frame rate of the input video data may be higher than the default frame rate (e.g., 24 fps, 25 fps, 30 fps or 60 fps) that can be displayed on a display device or decoded by the decoder. The decoder may be part of the display device.

Determining if the frame rate of the input video data is above a threshold (box 520) may include determining the frame rate of the input video data. The threshold may be the default frame rate (e.g., 24 fps, 25 fps, 30 fps or 60 fps) that can be displayed on a display device or decoded by the decoder. The threshold may dynamically change based on the available resources on the device used to display the video data. These resources may include the resources used to decode the video data and/or the resources used to play the video content. The threshold may be set to a frame rate which can be displayed by all of the devices receiving the video data or the threshold may be set to an average frame rate at which the devices display the video data. The threshold may be based on the playback speed set by a user using the device to display the video data. The default frame rate may be a normal playback mode of the display device.

If the frame rate of the input video data exceeds the threshold (yes in box 520), then the encoder may increase the number of frames that are droppable in the encoded video data. The number of droppable frame may be increased by changing the encoder parameters to provide additional droppable frames which are not used in the prediction of any other frames. In one embodiment, the number of droppable frames may be increased to provide a droppable frame for any frames exceeding the threshold frame rate. For example, when the frame rate threshold is 60 fps and the frame rate of the input video data is 240 fps, at least three out of every four frames may be encoded as droppable frames. When the frame rate threshold is 60 fps and the frame rate of the input video data is 120 fps, at least one out of every two frames may be encoded as droppable frames.

If the frame rate of the input video data is at or below the threshold (no in box 520), coding the input video data (box 540) may include coding the input video data with default parameters. The defaults parameters may specify that there is no preference on the number of non-droppable and droppable frames in the encoded video data. Coding the input video data with default parameters may include encoding the input video data according to constraints imposed by bit rate requirements, quality requirements and/or error resiliency policies, without regard for the number of droppable frames per second.

If the input video data frame rate is above the threshold (yes in box 520), coding the input video data (box 540) may include coding the input video data with altered parameters to provide additional droppable frames. Coding the input video with parameter changed to provide additional droppable frames, may increase the bit rage, reduce the quality and/or increase error resiliency because the frames cannot depend on data in the droppable frames. Encoding the input video data may include coding the droppable frames as I-frames, P-frames or B-frames. The encoding parameters and the content of the video may be used to determine how the droppable frames are coded. Coding the video data with additional droppable frames may include providing enough droppable frames to ensure that a specified number of droppable frames are provided per second.

The non-droppable frames may be used to for display of video data in a normal playback mode. The droppable frames and the non-droppable frames may be used for display of the video data in an enhanced playback mode.

Once the input video data is coded, the encoded video data may be transmitted (box 550). Transmitting the coded video data may include transmitted which frames in the encoded video data are droppable frames. Transmitting the coded video data may include transmitting both the droppable and non-droppable frames (i.e., frames with data on which other frames depend).

Figure 6:
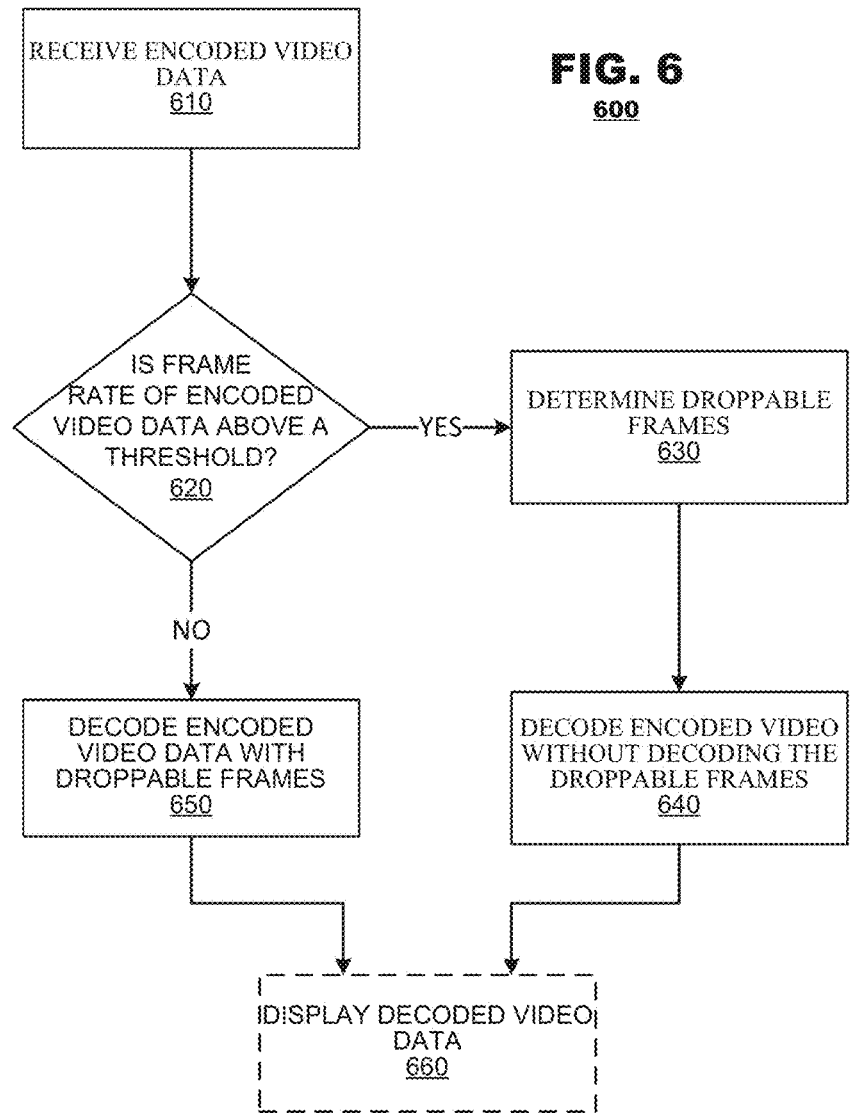
FIG. 6 illustrates a method for decoding video data with droppable frames according to an embodiment of the present invention.

FIG. 6 illustrates a method 600 of decoding video data with droppable frames according to an embodiment of the present invention. The method 600 may include receiving encoded video data (box 610), determining if the frame rate of the encoded video data is above a threshold (box 620), if the frame rate of the encoded video data is above the threshold (yes in box 620) determining which frames are droppable (box 630) and decode the encoded video data without decoding the droppable frames (block 640), if the frame rate of the encoded video data is not above the threshold (no in box 620) decode the encoded video data (block 650).

Receiving the encoded video data (box 610) may include receiving an encoded video data over a communication channel. The encoded video data may include a high frame rate (e.g., 120 fps or 240 fps). The frame rate of the encoded video data may be higher than the default frame rate (e.g., 24 fps, 25 fps, 30 fps or 60 fps) that can be displayed on a display device or decoded by the decoder in the display device. The encoded video data may include droppable frames, which do not have any other frames depend on the data in the droppable frames.

Determining if the frame rate of the encoded video data is above a threshold (box 620) may include determining the frame rate of the encoded video data. The threshold may be the default frame rate (e.g., 24 fps, 25 fps, 30 fps or 60 fps) that can be displayed on a display device or decoded by the decoder. The threshold may dynamically change based on the available resources on the device used to display the video data. These resources may include the resource used to decode the video data and/or the resources used to play the video content. The threshold may be preset for the device used to display the video content. The threshold may be based on the playback speed set by a user using the device to display the video data (e.g., normal mode or enhanced mode).

If the frame rate of the input video data exceeds the threshold (yes in box 620), then the decoder may determine which frames in the encoded video data are droppable (box 630) and decode the encoded video data (box 640) without decoding the droppable frames. The encoded video data may include a flag to indicate which frames are droppable frames. In another embodiment the decoder may determine which frames in the encoded video data are droppable. The decoder may decode only frames needed to provide decoded data at a frame rate that corresponds to the frame rate threshold. If the frame rate threshold is dynamic, due to changing resources of the decoder and/or the display, the decoder may change the number of droppable frames that are decoded to track the frame rate threshold. Thus, if the frame rate threshold is increased, the decoder may increase the number of droppable frames that are decoded. If the frame rate threshold is decreased, the decoder may reduce the number of droppable frames that are decoded.

If the frame rate of the encoded video data is equal to or below the threshold (no in box 620), the decoder may decode all of the frames in the encoded video data (box 650) which include droppable frames and non-droppable frames. Decoding the encoding video data (box 650) may include decoding all of the droppable frames in the encoded video data.

The method 600 may include displaying the decoded video data (box 660) on a display of a device.

Figure 7:
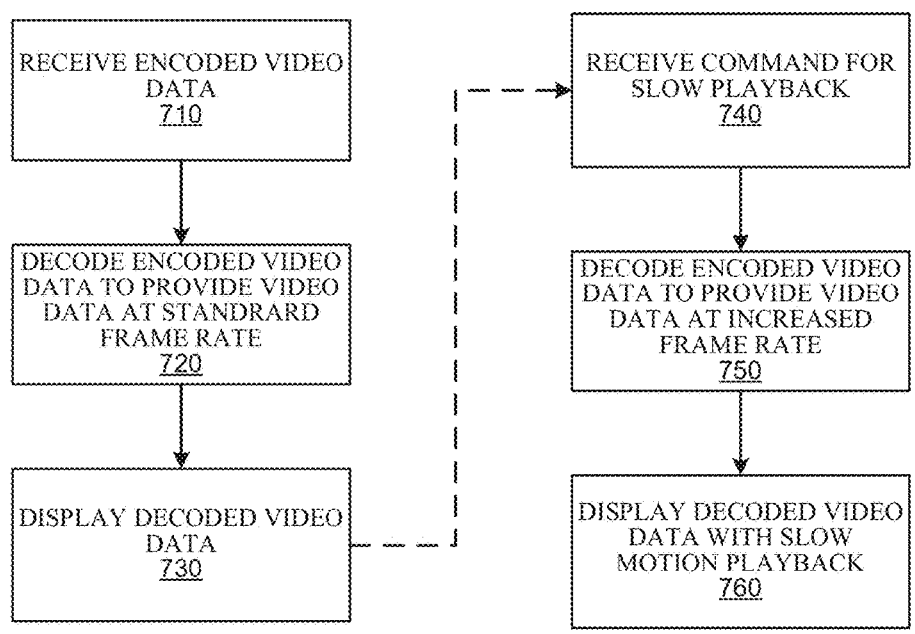
FIG. 7 illustrates a method for decoding video data with droppable frames for slow motion playback.

FIG. 7 illustrates a method of decoding video data with droppable frames for slow motion playback. The method 700 may include receiving encoded video data (box 710), decoding encoded video data to provide decoded video data at a standard frame rate (box 720), displaying the decoded video data with the standard frame rate (box 730), receiving a command to display the video data with slow motion playback (box 740), in response to the command, decoding encoded video data to provide decoded video data at an increased frame rate (box 750), and displaying the decoded video data with slow motion playback (box 760).

Receiving the encoded video data (box 710) may include receiving an encoded video data over a communication channel. The encoded video data may include a high frame rate (e.g., 120 fps or 240 fps). The frame rate of the encoded video data may be higher than the default frame rate (e.g., 24 fps, 25 fps, 30 fps or 60 fps) that can be displayed on a display device or decoded by the decoder in the display device. The encoded video data may include droppable frames, which do not have any other frames depend on the data in the droppable frames.

The encoded video data may be decoded (box 720) to provide decoded video data with a standard frame rate. The standard frame rate (e.g., 30 fps) may be a rate that is normally displayed on the display of a device or a rate that can be handled by resources of the decoder and/or the display. Decoding the encoded video data may include dropping droppable frames before the encoded video is decoded. The number of droppable frames that are dropped may correspond to the number of frames needed to bring the frame rate of the decoded video data to the standard frame rate. The decoded video data may be displayed on a display of a device (box 730) at the standard frame rate.

A user may issue a command to display the video data with slow motion playback (box 740). The user may issue the command during the playback of video data at the standard frame rate (box 730). In response to the command, the encoded video data may be decoded to provide the decoded video data at an increased frame rate (box 750). The increased frame rate may be used to display the same video content at the same frame rate (e.g., standard frame rate) but to display the additional video content from the droppable frames with a slow motion playback (box 760). The timing of the droppable frames used to provide the slow motion may be changed to display the droppable frames at the standard frame rate.

To increase the number of frames to display, the encoder may decode additional droppable frames. The number of additional droppable frames that are decoded may correspond to the slow motion playback speed selected by the user. Thus, if the playback speed that is selected is reduced, more droppable frames may be decoded. When the user selects standard playback speed, the decoder may again increase the number of droppable frames that are dropped to reduce the decoded video data frame rate to the standard frame rate.

Figure 8:
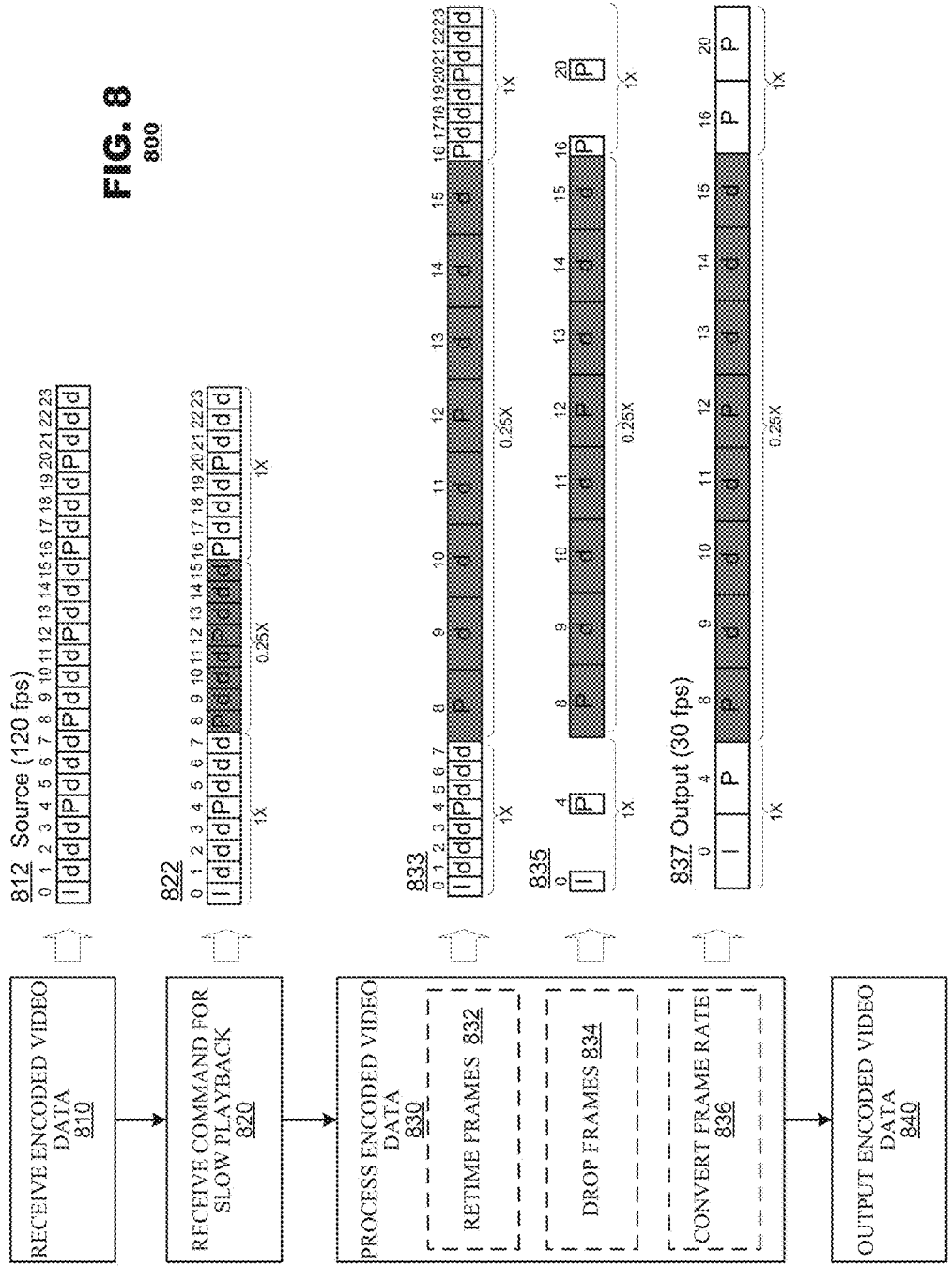
FIG. 8 illustrates a method for processing video data with slow motion according to an embodiment of the present invention.

FIG. 8 illustrates a method of processing video data with slow motion according to an embodiment of the present invention. The method 800 may include receiving encoded video data (box 810), receiving command for slow playback (box 820), processing the encoded video data for slow playback (box 830) and outputting the encoded video data (box 840). The method 800 may be performed without having to transcode the input video data. The method 800 may be performed in software and/or hardware.

Receiving the encoded video data (box 810) may include receiving an encoded video data over a communication channel or from a storage device. The encoded video data may include a high frame rate (e.g., 120 fps or 240 fps). The frame rate of the encoded video data may be higher than the default frame rate (e.g., 24 fps, 25 fps, 30 fps or 60 fps) that is used to display the video content on the display device. The default frame rate may be limited by the available resources on the display device to decode and/or display the video content. As shown in FIG. 8, the input encoded video data 812 may include droppable frames 'd.' and non-droppable frames 'I' and 'P'. Droppable frames may include frames which do not have any other frames depend on the data in the droppable frames. Non-droppable frames may include frames that are used as reference frames for encoding other frames. As discussed above, I-frames, P-frames and -B frames may be droppable if other frames (e.g., P frames or B frames) do not depend on them to be decoded. While in FIG. 8 the input video data is shown with a group of pictures (GOP) having a pattern of three droppable frames following each I-frame and each P-frame, other patterns may be included in the GOP.

Receiving the command for slow motion playback (box 820) may include a selection of a portion of the input video data that should be displayed with slow motion. Displaying in slow motion may change the duration of the content shown in each frame of the selected portion. In the example of FIG. 8, the input video data 822 may include frames 8-15 which are selected to be displayed at a slow motion rate of 0.25× of the original frame rate. Frames 0-7 and frames 16-23 may be not selected for displaying in the slow motion.

The command for slow motion playback (box 820) may include a starting frame or a starting time at which to start the slow motion playback. The command may include a starting frame and an ending frame for the slow motion playback or alternatively, a starting time and an ending time. Alternatively, the command may include a starting frame/time and duration (e.g., in time or number of frames) for which slow motion playback should be provided. The command may include the speed or scaling factor for the slow motion playback. In one embodiment, the slow motion playback speed that is applied to a portion of the input video data may be predefined at fixed values (e.g., 0.25×, 0.5× or 0.75× speed of the original rate). The command for slow motion playback may be received from selections made on video content in the original video data with the high frame rate, from selections made on video data provided at a default frame rate used to display the frame content (e.g., 30 fps) or from selections made based on reference frames (e.g., I-frames and/or P-frames) in the original high frame rate content. The command for slow motion may be received while the video data is being displayed on the display device at the default frame rate.

In response to the command for slow motion playback, the input encoded video data may be processed to adjust the timing (e.g., duration of the frames) of the selected portion of the input video data. The duration of the frames in the selected portion of the input video data may be increased to provide the selected slow motion speed (e.g., playback of 0.25× or 0.5× of the original rate). For example, if the frame rate of the input video data is 120 fps and a portion of the input video data is to be displayed at 0.25× the speed of the original video data content, the duration of the frames in the selected portion may be adjusted to provide 30 fps, while the duration of the frames in the not selected portion may be maintained at 120 fps.

In one embodiment, the duration of the frames in the selected portion of the input video data may be increased to display the video content at the selected slow motion speed based on a fixed frame rate that will be used to display the content of the video data. For example, if the frame rate of the input video data is 120 fps, the output video data frame rate is set to 30 fps, and a selected portion of the input video data is to be displayed at 0.25× the speed of the original rate, the duration of the frames in the selected portion may be adjusted to provide 30 fps (without dropping any frames) and a number of frames in the not selected portion may be dropped and the duration of the remaining frames in the not selected portion may be adjusted to provide 30 fps.

In another embodiment, one or more frames in the selection portion of the input video data may be dropped to achieve the desired slow motion at fixed display frame rates.

Frames in the selected portion to be displayed with slow motion may be dropped if the ratio between the display frame rate and the input video data frame rate is less than the slow motion speed (e.g., 0.25 or 0.5) to be applied to the portion of the video data. For example, if the frame rate of the input video data is 240 fps, the frame rate of the displayed video data is 30 fps, and the desired slow motion speed is 0.25×, half of the frames in the selected portion of the video data may be dropped and the duration of the rest of the frames in the selected portion may be increased to be output at 30 fps.

In one embodiment, processing the encoded video data for slow playback (box 830) may include retiming the frames in the selected portion (box 832), dropping droppable frames (box 834) and/or converting the frame rate in the non-selected portion (box 836) to output encoded video data at a constant frame rate.

Retiming the frames (box 832) may include changing the duration of the frames in the portion selected for slow motion. In the example of FIG. 8, the duration of frames 8-15 in image sequence 833 may be changed to provide 0.25× speed of the original frame rate. Each frame in the selected portion may be adjusted to provide the output frame rate. The frames which are not selected for slow motion (e.g., frames 0-7 and frames 16-23) may be maintained at the same duration.

Dropping droppable frames (box 834) may include dropping droppable frames in the portion of the image sequence not selected for slow motion. The frames may be dropped to provide a frame rate at which the video content will be displayed. For example, if the input video data is provided at 120 fps and the output video data is to be displayed at 30 fps, a third of the frames may be dropped. As shown in FIG. 8, frames 1, 2, 3, 5, 6, 7, 17, 18, 19, 21, 22 and 23 in the image sequence 835 may be dropped. As discussed above, in some embodiments frames in the selected portion may also be dropped.

After the frames are dropped, the frame rate of the frames in the non-selected portion may be adjusted (box 836). The adjustment of the frame rate may include adjusting the duration of the frames to provide a constant frame rate in the output video data. In the example of FIG. 8, all of the frames in the selected portion and the non-selected portion of the image sequence 837 may be provided at the same frame rate (e.g., 30 fps).

Outputting the encoded video data (box 840) may include displaying the processed video data on a display device, storing the processed video on in memory or a storage device or transmitting the processed video over a communication channel. The processed video data may be stored for later display or to be processed by a subsequent process (e.g., applying visual effects or processing the video data). Subsequent processes may include applying visual effects to the transitions between regular playback and slow motion playback.

FIG. 9 illustrates image sequences of video data that may be processed according to an embodiment of the present invention. The input image sequence 910 may represent 23 frames that are captured at 120 fps to provide approximate 0.2 seconds of video content. While the example shown in FIG. 9 is illustrated with a specific number of frames, the embodiments of the present invention are not so limited.

The input image sequence 910 may include a selected for slow motion portion 912, not selected portions 914 and intermediate slow motion portions 916. The input image sequence 910 may include a GOP of frames including reference frame I, droppable frames p, and non-droppable frames P. The GOP of frames may not be limited to the structure of frames shown in image sequence 910.

A group of frames in the input image sequence 910 may be selected to provide a portion of the sequence 912 selected for slow motion playback. The selections may be made such that the portions start on an I frame or on a non-droppable frame P. The input image sequence 910 may include portions 914 that are not selected for slow motion playback. A user may select a scaling factor for the slow motion playback portion 912. The user may select the slow motion to be applied to the slow motion playback portion 912 from a predefined slow motion speeds (e.g., 0.75×, 0.5× and 0.25×).

The input sequence may include portions of the sequence 916 for intermediate slow motion playback. The intermediate slow motion playback portions 916 may be used to gradually adjust the playback speed of the image content. The intermediate slow motion playback portions 916 may be set by the system or selected by the user. The system may set the slow motion playback and/or the duration of the intermediate slow motion playback portions 916 based on the selections made for the slow motion playback portion 912. In one embodiment, the system or the user may select the frames for the intermediate slow motion playback portions 916 from the slow motion playback portion 912 or from the not selected portions 914.

The frames in the input image sequence 910 may be retimed to provide the selected playback in the slow motion playback portion 912 and/or the intermediate slow motion playback portions 916. For example, the duration of each frame in the slow motion playback portion 912 may be adjusted from $\frac{1}{120}$ seconds to $\frac{1}{30}$ seconds to provide 0.25× scaling. The duration of each frame in the intermediate slow motion playback portions 916 may be adjusted from $\frac{1}{120}$ seconds to $\frac{1}{60}$ seconds to provide 0.25 scaling. The duration of the frames in the not selected portions 914 may be maintained at $\frac{1}{120}$ seconds. An example of the input sequence with the adjusted timing is shown in image sequence 920. As shown in image sequence 920, due to the adjusted timing, the image sequence may include a variable frame rate.

To provide a constant frame rate, a plurality of frames may be dropped from the image sequence 920. Image sequence 930 illustrates the image sequence after the droppable frames are removed. As shown in the image sequence 930, $\frac{3}{4}$ of the frames may be removed from the not selected portions 914, $\frac{1}{2}$ of the frames may be removed from the intermediate slow motion playback portions 916 and no frames may be removed from the slow motion playback portion 912.

After the droppable frames are removed, retiming may be performed on the remaining frames to provide a constant frame rate. Image sequence 940 illustrates an output sequence with adjusted frame duration. The image sequence 940 may represent 14 frames at 30 fps providing approximately 0.47 seconds of video. The total duration of the frames in image sequence 940 may correspond to the total duration of the frames in image sequence 920. However, the frames in image sequence 920 may include a variable frame rate. The output sequence 940 may be displayed on a display device, stored in a storage device or transmitted to another device over a communication channel.

While the embodiments shown in FIGS. 8 and 9 are shown with an input image sequence having a constant high frame rate, these embodiments may be extended to input image sequences with variable frame rates.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture, processing and distribution field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A coding method, comprising:
 coding, by the encoder, an image sequence according to predictive coding techniques in which select coded frames serve as prediction references for other coded frames, wherein the coding comprises:
  distinguishing first frames from the image sequence that are to be displayed according to a display rate of a normal playback mode at a decoder from additional droppable frames of the same image sequence associated with a slow motion playback mode that are to be displayed at the decoder at a display rate that is higher than the display rate of the normal playback mode,
  for the first frames, coding the first frames according to the predictive coding techniques in which the respective first frames are candidates to serve as prediction references for other first frames of the image sequence, and
  for the additional droppable frames, coding the additional droppable frames according to the predictive coding techniques using reference frames from the first frames as prediction references, wherein the additional droppable frames are prevented from serving as prediction references for any of the first frames of the image sequence, such that at least one additional droppable frame can be retimed and presented in slow motion at a decoder.

2. The method of claim 1, wherein the image sequence includes a plurality of frames having a frame rate that exceeds the display rate of the normal playback mode.

3. The method of claim 1, wherein the image sequence includes a plurality of frames having a frame rate that at least matches the display rate of the enhanced playback mode.

4. The method of claim 1 further comprising transmitting the coded image sequence over a communication channel.

5. The method of claim 1, wherein the image sequence has a variable frame rate.

6. The method of claim 1, wherein the display of the normal playback mode rate is a frame rate used to display the image sequence on a display device.

7. The method of claim 1, wherein the remaining frames include an intra-frame (I-Frame), a predictive frame (P-Frame) and a bidirectional frame (B-Frame).

8. The method of claim 1, further comprising:
 transmitting the coded image sequence; and
 decoding the coded image sequence.

9. A decoding method, comprising:
 decoding a coded image sequence according to predictive decoding techniques in which select coded frames are coded using other coded frames as prediction references, wherein the decoding comprises:
  distinguishing first frames from the image sequence that are to be displayed according to a display rate of a normal playback mode at a decoder from additional droppable frames of the same image sequence associated with a slow motion playback mode that are to be displayed at the decoder at a display rate that is higher than the display rate of the normal playback mode,
  for the first frames, decoding the first frames according to the predictive coding techniques in which the respective first frames are candidates to serve as prediction references for other first frames of the image sequence,
  for the additional droppable frames, decoding the additional droppable frames according to the predictive coding techniques in which the remaining frames are decoded predictively using reference frames from the first frames as prediction references, wherein the additional droppable frames are prevented from serving as prediction references for any of the first frames of the image sequence,
  for a slow motion portion of the coded image sequence, retiming frames according to a slow motion playback rate, presenting decoded first frames from outside the slow motion portion at the display rate of normal playback mode, and presenting retimed first frames and at least one retimed additional droppable frame from the slow motion portion at the display rate of normal playback mode.

10. The method of claim 9, wherein the coded image sequence includes a plurality of frames having a frame rate that exceeds the display rate of the normal playback mode.

11. The method of claim 9, wherein the coded image sequence has a variable frame rate.

12. The method of claim 9, wherein the remaining frames include an intra-frame (I-Frame), a predictive frame (P-Frame) and a bidirectional frame (B-Frame).

13. The method of claim 9, wherein the display rate of the enhanced playback mode is selected based on resources available for decoding the coded image sequence.

14. The method of claim 9, wherein the display rate of the enhanced playback mode is selected for a portion of the coded image sequence to be displayed with slow motion.

15. The method of claim 9, further comprising:
transmitting the coded image sequence; and
decoding the coded image sequence.

16. A non-transitory storage device that stores a predictively-coded image sequence comprising a plurality of coded frames, wherein select coded frames serve as prediction references for other coded frames, first frames are distinguished from the image sequence that are to be displayed according to a display rate of a normal playback mode from additional droppable frames of the image sequence associated with a slow motion playback mode that are to be displayed at a display rate that is higher than the display rate of the normal playback mode, the first frames are coded according to the predictive coding techniques in which the respective first frames are candidates to serve as prediction references for other first frames of the same image sequence, and the additional droppable frames are coded according to the predictive coding techniques using reference frames from the first frames as prediction references, wherein the additional droppable frames are prevented from serving as prediction references for any of the first frames of the same image sequence such that at least one additional droppable frame can be retimed and presented in slow motion at a decoder.

17. The device of claim 16, wherein the coded frames are transmitted and decoded.

18. A method for processing a coded image sequence for slow motion playback at a display, the method comprising:

receiving a coded image sequence with a frame rate of an enhanced playback mode that is higher than a display rate of a normal playback mode of a display that will display a decoded image sequence;

receiving a command selecting a portion of the coded image sequence for slow motion playback at the display;

decoding the frames in the selected portion according to predictive coding techniques in which the frames in the selected portion are candidates to serve as prediction references for other first frames of the same image sequence; and retiming durations of the decoded frames within the selected portion for slow motion playback from a duration of the higher frame rate of the enhanced playback mode to a display duration of frames at the display rate of the normal playback mode;

decoding remaining frames outside the selected portion according to the predictive coding techniques using reference frames from the first frames as prediction references, wherein certain of the remaining frames outside the selected portion that do not serve as prediction references for first frames of the image sequence are dropped prior to displaying at the display;

presenting decoded first frames from outside the portion for slow motion at the display rate of the normal playback mode; and presenting retimed first frames and at least one retimed additional droppable frame from the portion for slow motion at the display rate of normal playback mode.

19. The method of claim 18 further comprising, retiming the remaining frames in the portions outside of the selected portion.

20. The method of claim 18 further comprising storing the decoded image sequence without the remaining frames in memory.

21. The method of claim 18 further comprising decoding the coded image sequence without the decoding the remaining frames.

22. The method of claim 18 further comprising generating an intermediate slow motion portion in a portion of the image sequence adjacent to the selected portion, the intermediate slow motion portion including a playback speed that transitions between a default playback speed and a playback speed of the selected portion.

* * * * *